United States Patent
Buenemann et al.

(10) Patent No.: US 10,103,543 B2
(45) Date of Patent: Oct. 16, 2018

(54) METHOD FOR CONTROLLING A LOAD

(71) Applicant: SMA Solar Technology AG, Niestetal (DE)

(72) Inventors: Mathias Buenemann, Kassel (DE); Matthias Groene, Kassel (DE); Bernhard Schropp, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 142 days.

(21) Appl. No.: 15/190,485

(22) Filed: Jun. 23, 2016

(65) Prior Publication Data

US 2016/0380431 A1 Dec. 29, 2016

(30) Foreign Application Priority Data

Jun. 23, 2015 (DE) .................... 10 2015 110 029

(51) Int. Cl.
*H02J 1/10* (2006.01)
*H02J 3/00* (2006.01)
(Continued)

(52) U.S. Cl.
CPC ............. *H02J 3/00* (2013.01); *G06Q 10/04* (2013.01); *G06Q 50/06* (2013.01); *H02J 3/14* (2013.01);
(Continued)

(58) Field of Classification Search
CPC ...... H02J 3/00; H02J 2003/003; G06Q 50/06; Y02B 70/3225; Y04S 20/222
See application file for complete search history.

(56) References Cited

U.S. PATENT DOCUMENTS 5,675,503 A * 10/1997 Moe .............. H02J 3/14
307/32
2004/0232878 A1* 11/2004 Couch ............ H02J 1/14
320/101
(Continued)

FOREIGN PATENT DOCUMENTS

DE 102013214996 A1 7/2014
DE 202014104370 U1 12/2014
(Continued)

OTHER PUBLICATIONS

European Search Report dated Oct. 21, 2016 EP 16 17 5299.

*Primary Examiner* — Jared Fureman
*Assistant Examiner* — Duc M Pham
(74) *Attorney, Agent, or Firm* — Eschweiler & Potashnik, LLC

(57) ABSTRACT

A method for controlling a load by providing a total energy consumption and a time window for the total energy consumption of the load from one or more energy sources is described. The method includes determining of energy blocks, wherein the energy blocks are based on a power interval during a time interval, the time intervals are within the time window and the energy blocks are allocated energy-source-dependent costs, sorting of the energy blocks in ascending order according to the level of the costs per energy block and subsequent summation of quantities of energy that the energy blocks contain in ascending order of sorting until the total energy consumption of the load is reached. From this, on and off times of the load are determined by means of the time intervals that belong to the summed energy blocks, wherein the power intervals belonging to the respective energy blocks determine a power consumption of the load at the respective instant, and the (Continued)

load is actuated in accordance with the on and off times. An apparatus for carrying out the method is likewise disclosed.

7 Claims, 3 Drawing Sheets

(51) Int. Cl.
    *G06Q 50/06*     (2012.01)
    *H02J 3/14*     (2006.01)
    *G06Q 10/04*     (2012.01)

(52) U.S. Cl.
    CPC ... *H02J 2003/003* (2013.01); *H02J 2003/146* (2013.01); *Y02B 70/3225* (2013.01); *Y04S 20/222* (2013.01); *Y04S 20/224* (2013.01)

(56) References Cited

U.S. PATENT DOCUMENTS

2006/0276938 A1* 12/2006 Miller ................. G06Q 50/06
                                                                                               700/295
2014/0046495 A1    2/2014 Magnussen et al.

FOREIGN PATENT DOCUMENTS

WO       2014067675 A1    5/2014
WO       2014155062 A1   10/2014

\* cited by examiner

METHOD FOR CONTROLLING A LOAD

CROSS REFERENCE TO RELATED APPLICATIONS

This application claims priority to German Patent Application number 10 2015 110 029.0, filed on Jun. 23, 2015, and is hereby incorporated by reference in its entirety.

FIELD

The disclosure relates to a method for controlling a load that allows cost-optimized operation of a load that can be operated at different power consumption levels.

BACKGROUND

Examples of loads whose power consumption can be varied are speed-regulated heat pumps or battery charge controllers for electric cars. Heating elements, for example for hot water preparation, often have discrete switching states for their power consumption; they have a regulatable power consumption, but only with due regard to the possible power steps. In the industrial sector too, variable loads exist, for example speed-regulated compressors for compressed air stores.

Known solutions to this optimization problem are associated with considerable numerical complexity. An example that may be mentioned is DE 10 2010 042 172 A1, which relates to a method for operating a controller for a domestic appliance on an energy supply system with an associated data network, wherein transmitted data from the energy supply system need to be taken into account for simultaneously available setting data for the domestic appliance. In order to determine manipulated variables for actuators of the domestic appliance, a computer executing a graph algorithm, for example Dijkstra's algorithm, is needed.

In order to map a regulatable energy draw for a load by means of the algorithms cited in DE 10 2010 042 172 A1, a multiplicity of auxiliary variables would need to be introduced, which increase numerical complexity immensely.

There is therefore a need for methods with low numerical complexity that allow an operation of a load with a variable power consumption at optimum cost in the case of multiple energy sources being available to meet the demand for this variable power consumption, especially when these multiple energy sources have different tariff structures and possibly also a different temporal availability.

SUMMARY

The present disclosure is directed to an improved method for controlling a load with a variable power consumption. A total energy consumption and a time window for feeding the total energy consumption to the load are provided, the total energy consumption may to be provided from multiple energy sources. The total energy consumption and the corresponding time window may be given in advance by a user, by the load itself or by an energy management system.

In one embodiment, a method according to the disclosure determines energy blocks, the energy blocks each being based on a power interval during a time interval. The time intervals are arranged within the time window, and the energy blocks are allocated energy-source-dependent costs.

The term time interval is intended to be understood in one embodiment as the period of time between the beginning of the interval, for example 10:00 hours, and the end of the interval, for example 10:01 hours, that is to say the start and end or start and length of the interval. In the example cited, the length of the interval would be one minute, and in general, the length of the interval may of course be arbitrary, $t \ldots t+\Delta t$. The term power interval during a time interval is similarly intended in one embodiment to mean a power between a lower power level, for example 700 W, and an upper power level, for example 1000 W. In this example, the power of the power interval would be 300 W (watts), this power being intended to be available, or consumed, during the associated time interval. In our example, the energy content of the associated energy block amounts to 300 W×(1/60 h)=5 Wh.

The energy block is then allocated costs, these being dependent on the energy source producing them, and additionally, the costs may also have a time dependency, as is known from overnight electricity tariffs, for example, in which case the costs are also based on the underlying time interval.

Subsequently, the energy blocks are sorted in ascending order according to the level of the costs per energy block, that is to say that in one embodiment the energy blocks having the lowest price should be considered for consumption first of all. Having been sorted in ascending price order, the quantities of energy contained in the energy blocks are summed until a quantity of energy has been reached that corresponds to the total energy consumption of the load.

The time intervals belonging to the summed energy blocks are used to determine on and off times of the load, wherein the power intervals belonging to the respective energy blocks determine a power consumption of the load at the respective instant and the load can be actuated accordingly. If, in the example mentioned above, the energy block were to belong to this total of energy blocks that are selected for supplying power to the load in this way, then the load would be switched from a power consumption of 700 W to 1000 W at 10:00 hours. This would—in the example—happen for at least one minute. This would be followed by a further energy block, which can signify the power consumption remaining constant, being reduced or rising further, depending on the associated power interval. If a selected energy block does not immediately follow the preceding one, then the load is switched off.

The described sorting and selection of the energy blocks causes that the method according to the disclosure ascertains a plan for controlling the load that is associated with the lowest price for the desired energy consumption without great computation complexity.

For loads with discrete power consumption levels, these discrete power consumption levels determine the power intervals in one advantageous embodiment. By way of example, a hot water heater having three heating elements with a power consumption of 500 W each would thus be operable only in power consumption steps of 500 W, 1000 W or 1500 W. In this case, the level of the power intervals of the energy blocks would likewise have to be 500 W.

In a further advantageous embodiment, at least some of the energy for operating the load is obtained from a renewable energy source, for example, a photovoltaic generator. Since the energy output from these energy sources can vary greatly over time, the availability of the energy sources for an instant in the future can be determined in one embodiment using a forecast. Therefore, the quantity of energy blocks that may be obtained from at least one renewable energy source is determined by using a forecast.

In the case of loads with a continuous, variable power consumption, the power intervals may be determined by a power of the renewable energy source in the associated time interval in a further advantageous embodiment. From a forecast, it is possible to infer a power level of the renewable energy source at a given instant. The prescribed time window is divided into time intervals, and these may then be allocated the associated power intervals.

In some instances renewable energy sources not only supply power to local loads but also supply to a surrounding energy system, like a mains power supply. The fluctuating supply of renewable energy in the systems can affect the stability of the systems, however. Therefore, upper supply limits are given frequently, which means that there is an upper limit up to which a renewable energy source is permitted to supply to the system. If the renewable energy source is able to output more energy, then the generator needs to be down-regulated or the excess energy needs to be consumed locally.

In one embodiment of the method according to the disclosure, those energy blocks that can be obtained from the at least one renewable energy source and that exceed the upper supply limit in accordance with the forecast are assigned the lowest costs.

In one embodiment of the method according to the disclosure, the time intervals are determined as equal-sized portions of the time window.

If multiple loads are intended to be operated by means of the method according to the disclosure, then the method according to the disclosure can be performed for the different loads in succession, in which case the load for which the method according to the disclosure is performed first can be operated least expensively. Alternatively, the method according to the disclosure can be performed alternately for the different loads in iterative loops so as thereby to arrive at a minimum cost for all loads.

In a further advantageous embodiment, the costs of the energy blocks are determined by taking account of the consequential environmental costs of the energy producers producing them. For the obtainment of energy from the mains power system, it is thus also possible to take assumed or extrapolated consequential environmental costs for these energy blocks as a basis instead of the reference tariff that actually has to be paid. In this case, different costs would be estimated for energy that is obtained from the mains power system and produced by a hydroelectric power station than for energy that has been produced in coal-fired power stations. Often, this will be difficult in practice, since the source of the energy is not known for certain in the mains power system. In this case, there merely needs to be clarification that "costs" is intended to be understood as an abstract term in this case and can be filled differently depending on the desired target direction.

An apparatus according to the disclosure for performing the method according to the disclosure for controlling a load comprises a first interface for outputting control commands to the load. These control commands may include signals for switching the load on and off and selecting a particular power consumption. In addition, the apparatus according to the disclosure comprises a second interface for receiving operating data from at least one renewable energy source and for sending control commands to the renewable energy source. Operating data may be power data from the renewable energy source, for example the currently supplied power or the maximum available power. These data may then be used to readjust the load control scheduled by means of the method according to the disclosure in accordance with the currently available power. Control commands that are sent to the renewable energy source may contain setpoint power data. In order to use the energy that needs to be limited on account of an upper supply limit, the control command to output the maximum available energy is sent, for example. At the same time, the apparatus according to the disclosure needs to ensure that the load consumes the energy that is to be limited by virtue of the relevant control commands being sent to the load.

The aforementioned interfaces may have been set up by a radio link or can be produced by any form of wired communication. Furthermore, the apparatus according to the disclosure has a third interface for receiving a forecast by means of which a quantity of energy blocks that can be obtained from the renewable energy source can be determined. This interface may be implemented by an Internet connection and can likewise be provided on a radio-assisted or wired basis. It is also possible to obtain only weather data externally, for example, and to generate the forecast for the relevant renewable energy source in the apparatus according to the disclosure itself. Furthermore, it is conceivable for the apparatus according to the disclosure to be integrated into the housing of an installation part of the renewable energy source, for example the inverter of a photovoltaic installation. In this case, the second interface would be a device-internal interface from the controller of the inverter to the apparatus according to the disclosure. If the inverter is additionally already connected to the Internet, then a forecast or weather data could likewise be sent to the apparatus according to the disclosure via this second, device-internal interface.

BRIEF DESCRIPTION OF THE DRAWINGS

The disclosure is explained in more detail below with references to figures, in which.

DETAILED DESCRIPTION

The disclosure relates to a method for controlling a load that allows cost-optimized operation of a load that can be operated at different power consumption levels. This optimization problem arises when there is an energy source with a differentiating tariff structure or multiple energy sources with a different tariff structure available for the operation of such a load. The numerical complexity for solving this optimization problem is particularly high when an energy source with a fluctuating supply is available, for example a photovoltaic installation installed at the location of the load.

Figure 1:
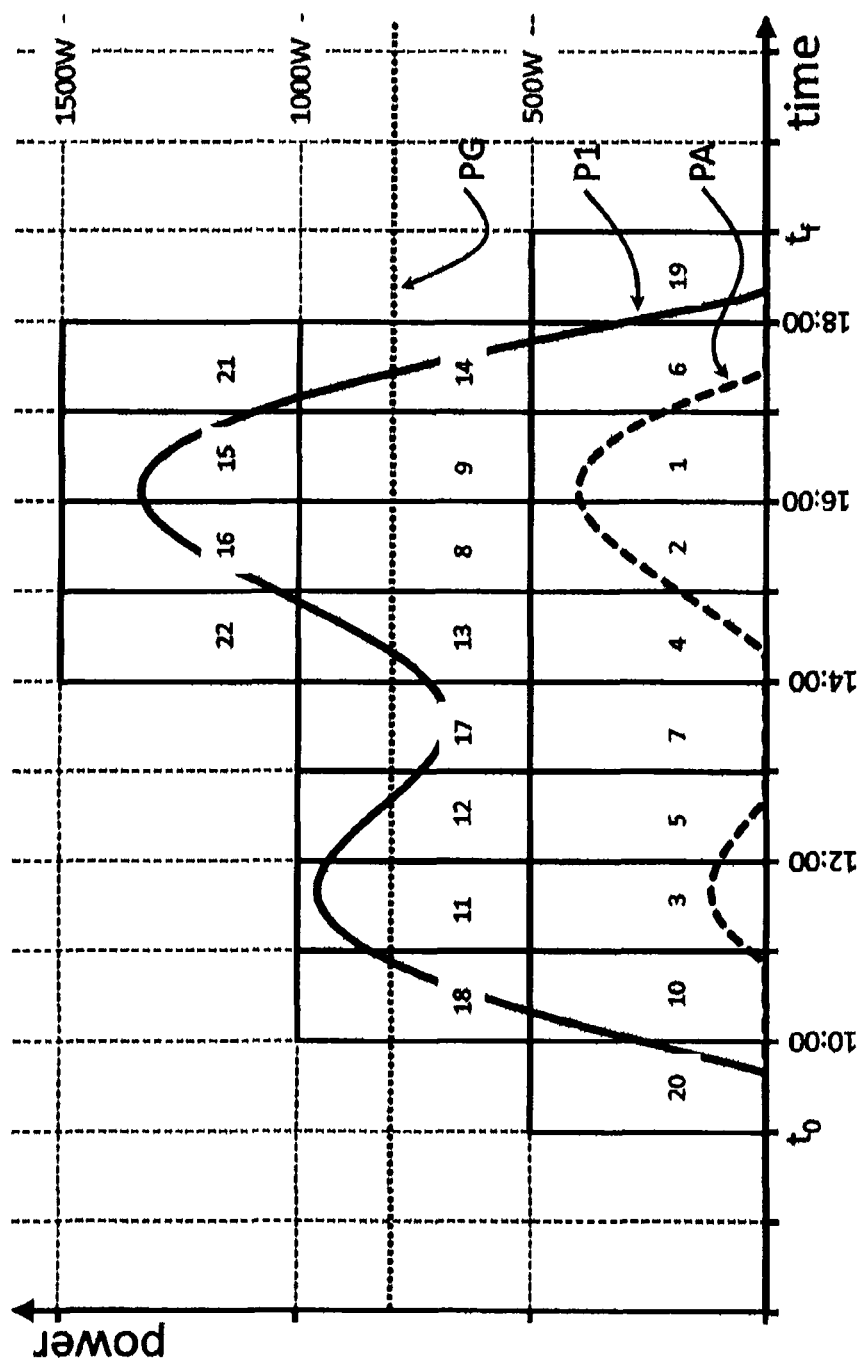
FIG. 1 shows a schematic illustration of energy blocks that have been sorted by means of an embodiment of the method according to the disclosure.

FIG. 1 plots power over time, and the resultant power-times-time area constitutes energy accordingly.

On the time axis, the prescribed time window for drawing the total energy consumption of the load is plotted from $t_0$ to $t_F$. The time window and the total energy consumption will normally be specified by the owner or user of the load. By way of example, a user could prescribe that a hot water heater is intended to output a total of 2000 Wh of energy to a hot water reservoir in a period of time between 9:00 hours and 19:00 hours. The time window between 9:00 hours and 19:00 hours will then be the basis for computing the relevant time intervals.

In this example, a photovoltaic installation is available at the location of the load, and the power that can be obtained by this photovoltaic installation within the time window is determined by using a forecast. This forecast may involve various parameters, for example the weather forecast from a weather service, power data from the same photovoltaic installation from periods of time in the past or power data from other photovoltaic installations. This forecast power P1 for the photovoltaic installation that is present locally is denoted by a solid line in the graph.

If a mains power system is also present at the location of the load, then energy can be drawn both from the photovoltaic installation and from the mains power system. Conversely, the energy produced by the photovoltaic installation can be consumed in situ or supplied to the mains power system. Alternatively, it is conceivable for the load to obtain energy from a local island power system to which multiple different energy sources supply, for example a biogas installation, a hydroelectric power station, a wind power installation and a diesel generator. For all these energy sources, it is possible to compute different production costs for the electric power they each provide. These can be used for the method according to the disclosure.

Many mains power systems now prescribe upper supply limits for greatly varying supplying energy sources. In the graph, an upper supply limit ($P_G$) is denoted by a horizontal line at 800 W. The portion of the forecast photovoltaic power above this upper supply limit $P_G$ is denoted by a dashed line ($P_A$). If the suppliable energy is based on a respective supply tariff, then costs of 0 ct/kWh may be assumed for the unsuppliable photovoltaic power $P_A$, which either needs to be limited or consumed. Since this energy should be consumed first of all, the unsuppliable photovoltaic power $P_A$ has been moved down in the graph for the sake of more suggestive presentation.

In the example, the hot water heater is meant to have three heating elements with a power consumption of 500 W each, as a result of which the heater is operable only in power consumption steps of 500 W, 1000 W or 1500 W. These power consumption steps determine the height of the power intervals, indicated by horizontal contours in the graph. If the time window is divided into hourly intervals, then the 22 energy blocks shown emerge with an energy content of 500 Wh each, identifiable in the graph in the form of a grid contour. Of course a much finer temporal division will be performed in practice, time intervals of minutes or even seconds being conceivable.

In the example, the cost allocation is performed as follows:
energy below the line ($P_A$) is allocated 0 ct/kWh;
energy above the line ($P_A$) but below the line ($P_1$) is allocated the supply tariff of the photovoltaic source as costs;
energy above the line ($P_1$) is allocated the reference tariff of the mains power system as costs.

In this case, it is assumed that the costs of the reference tariff of the mains power system are higher than those of the supply tariff.

Naturally, other costs may be allocated depending on the desired effect, for example the respective consequential environmental costs that arise from production of the energy producing installation and operation thereof. Depending on cost allocation, a different order for the energy blocks is then obtained.

The 22 energy blocks shown in the graph are allocated costs as indicated above. When an energy block is not intersected by a tariff line, such as the block numbered 7, it can be allocated costs as described above, in this case the supply tariff at 10 ct/kWh, for example. Block 7 is thus allocated costs of 0.5 kWh×10 ct/kWh=5 ct.

When a tariff boundary runs through the energy block, as in the case of block number 1, the costs are allocated in accordance with the area ratio. In the case of block number 1, approximately ⅔ of the area is situated in the limited region, that is to say that 0 ct/kWh is allocated, and ⅓ is situated in the 10 ct/kWh region. Thus, in this case, a mixed tariff of (⅔×0.5 kWh×0 ct/kWh)+(⅓×0.5 kWh×10 ct/kWh) =1.7 ct will be allocated.

The energy blocks are then sorted according to their allocated costs, beginning with the lowest costs in ascending order. The order obtained in this example is identified in the graph by the numbering of the energy blocks.

In this order, the quantities of energy that the energy blocks contain are summed until the prescribed total energy consumption of the load is reached. In our example, the hot water heater should consume a total of 2 kWh. By summing the 0.5 kWh "portions" of the energy blocks 1, 2, 3 and 4, a total of 2 kWh is reached.

The energy blocks 1, 2, 3 and 4 then determine the on and off times of the load. Energy block 3 determines the on time at 11:00 hours, that is to say that at 11:00 hours, the heater is switched on with a power consumption of 500 W for one hour, and at 12:00 hours, it is switched off. At 14:00 hours (start of energy block 4), the heater is switched on with a power consumption of 500 W again and at 17:00 hours (end of energy block 1), it is switched off.

Were a total energy consumption of the load of 4 kWh to be prescribed in the same time window, energy blocks 1-8 would be needed for the energy consumption. In this case, at 15:00 hours (start of energy block 8), the power consumption would be switched from 500 W to 1000 W. Thus, the associated power interval of the energy blocks determines the power consumption of the load at the respective instant.

Figure 2:
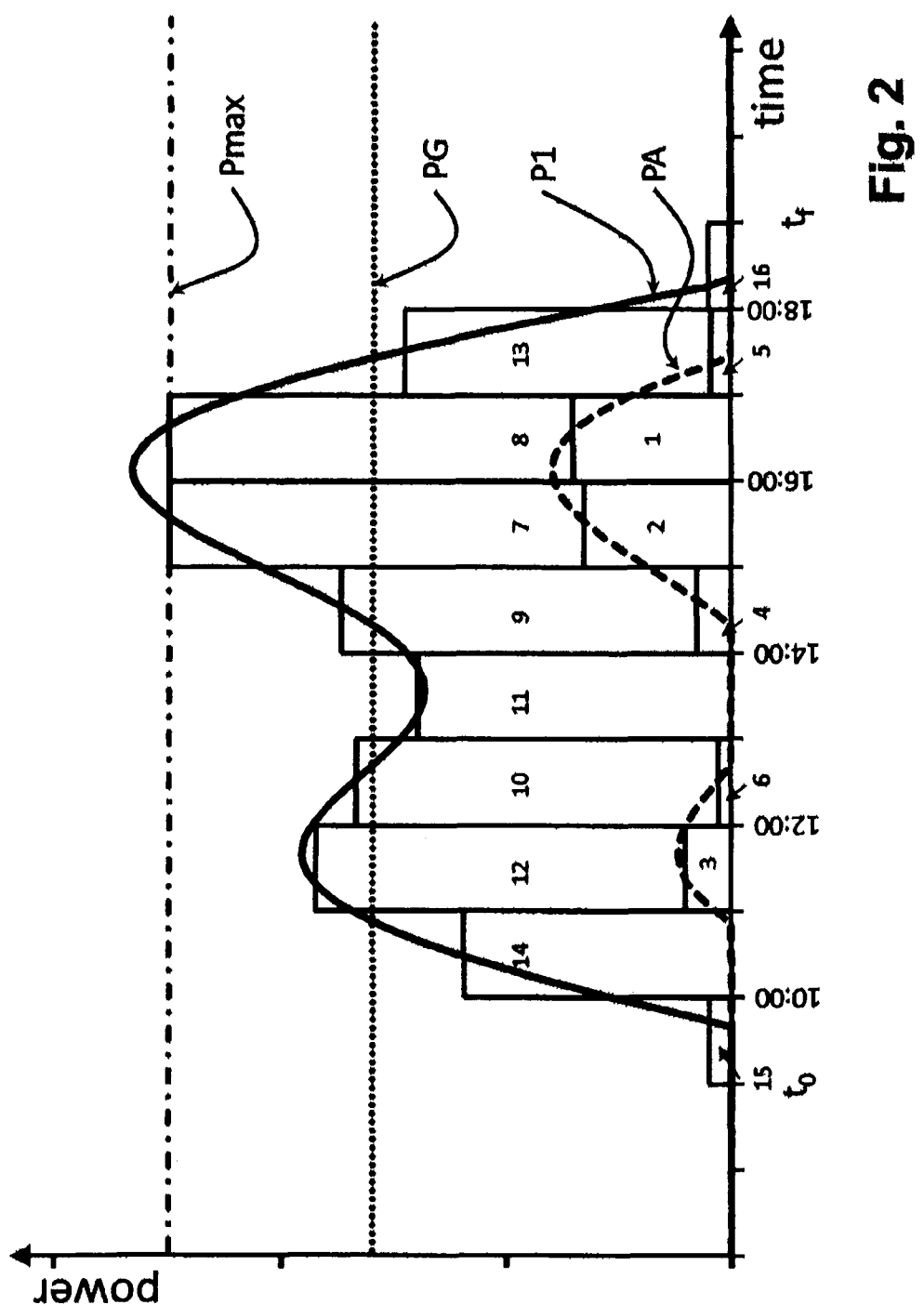
FIG. 2 shows a schematic illustration of energy blocks that have been sorted by means of a further embodiment of the method according to the disclosure.

FIG. 2 shows a similar situation to FIG. 1, the only intended difference in this case being that a load is actuated that permits a continuously variable power consumption. An example that may be used is a compressor whose speed can be continuously regulated. In FIG. 2, $P_{max}$ indicates the maximum power consumption of the load. Reference symbols that have also already been used in FIG. 1 are used quite analogously in this case.

On the time axis, the prescribed time window for drawing the total energy consumption of the load is again plotted from $t_0$ to $t_F$, the time intervals again being assumed to be hours. In this example, the levels of the power intervals are determined by the power of the renewable energy source in the associated time interval. This power of the renewable energy source is determined, as described above, by using a forecast, and the cost structure is also assumed to be as described above for FIG. 1. The maximum power consumption of the load $P_{max}$ is the upper limit of all possible power intervals.

In this example, the level of the power intervals is determined by the hourly mean value of the power of the photovoltaic installation. In practice, considerably shorter time intervals would naturally be chosen and, as a result, the power intervals would be able to approach the forecast curve with much more precision. Different levels of power intervals are obtained.

As in FIG. 1, that part of the energy that cannot be supplied, likewise shown by means of a dashed line ($P_A$), shall be consumed first in this case too. These energy blocks are allocated the lowest costs, these being energy blocks 1 to 6 in this example. The remaining numbered energy blocks are allocated the supply tariff. If these are not sufficient for the prescribed total energy consumption of the load, then the remainder of the energy is obtained from the mains power system at the reference tariff.

Since the energy blocks are not the same size in this example, it is necessary to use relative prices in order to restore price comparability. This means that a price per kWh is used, so that the price is normalized to a standard energy block size.

The energy blocks contain the following quantities of energy: block 1-350 Wh, block 2-300 Wh, block 3-100 Wh, block 4-70 Wh, block 5-50 Wh, block 6-30 Wh, block 7-1250 Wh, block 8-1200 Wh, block 9-950 Wh, etc. Energy blocks 1-6 together contain 900 Wh, and the relative price of the blocks is the same in each case, being assumed to be 0 ct/kWh in this example. The order in which they are now summed is arbitrary. Constraints such as avoiding frequent switching as far as possible or specification of a minimum operating time for a load can lead to the selection of contiguous time intervals. It is also possible—as in the example shown here—for sorting to be based on the energy content (size) of the blocks.

Energy blocks 7 to 14 are allocated the supply tariff at 10 ct/kWh, and further possible energy blocks are allocated the reference tariff of the mains power system.

If a hot water heater is intended to output a total of 2000 Wh of energy to a hot water reservoir in the period of time between 9:00 hours and 19:00 hours, as also in the example pertaining to FIG. 1, then energy blocks 1 to 7 would be summed (total: 2150 Wh). The following plan for actuating the load is thus obtained: at 11:00 hours, it is switched on with a power consumption of 100 W (start of block 3), at 12:00 hours, it is restricted to 30 W (block 6), at 13:00 hours, it is switched off. At 14:00 hours, it is switched on again at 70 W (block 4), at 15:00 hours, the power consumption becomes 300+1250=1550 W (blocks 2 and 7—which is also meant to be the maximum power consumption of the load in this example), at 16:00 hours, the power consumption is restricted to 350 W (block 1), at 17:00 hours, it is restricted to 50 W, and at 18:00 hours, it is switched off.

If the load needs to draw 4 kWh, blocks 1 to 9 would be summed (total 4300 Wh). In this case to begin as described above, at 14:00 hours, the power consumption would be switched to 70+950=1020 W (blocks 4 and 9), at 15:00 hours, to 1550 W (as above), this power consumption would then continue until 17:00 hours (blocks 1 and 8), and then the load would continue to be actuated as described above.

Very much shorter time intervals than the hourly intervals shown here by way of example allow the total energy consumption to be achieved more precisely.

Figure 3:
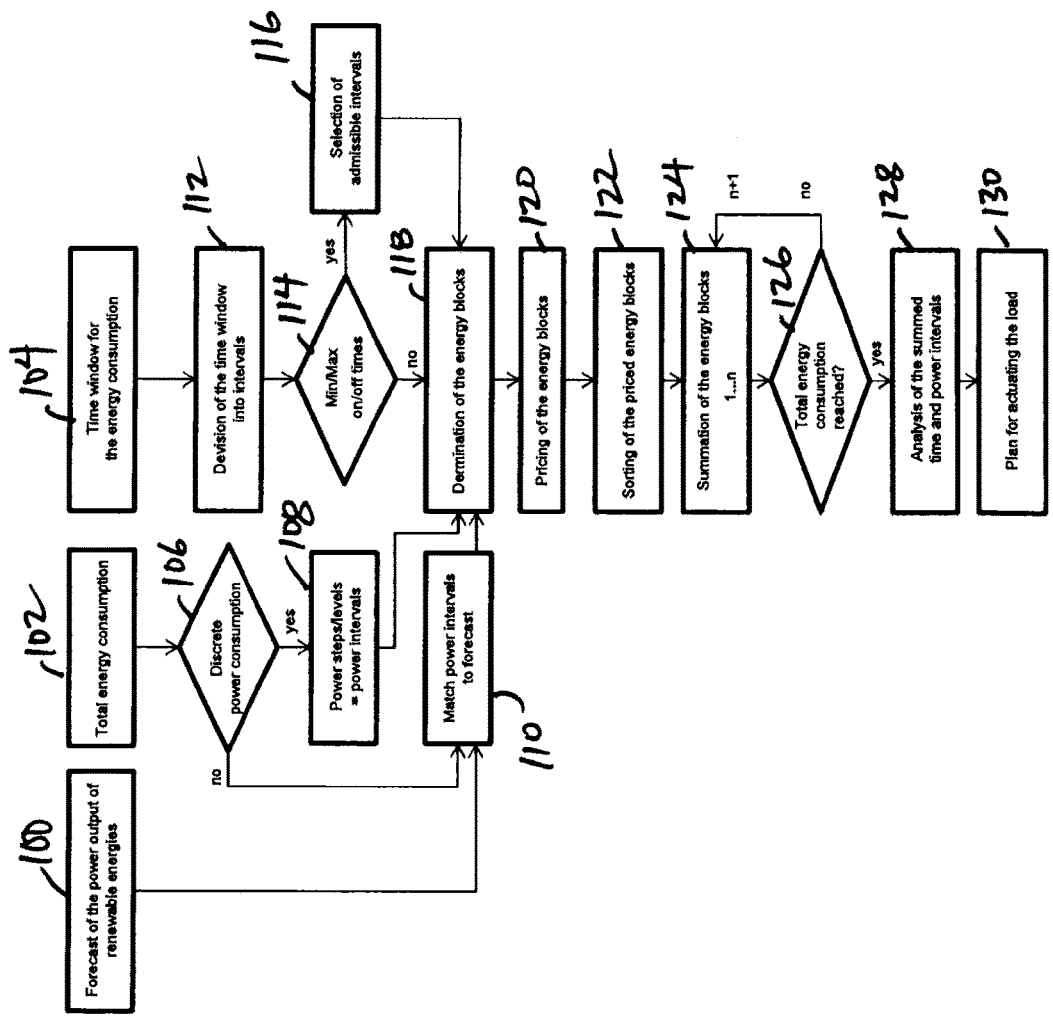
FIG. 3 shows a schematic illustration of an embodiment of the method according to the disclosure.

FIG. 3 shows an embodiment of the method according to the disclosure in the form of a schematic flowchart. As input, the "forecast of the power output of renewable energies", the specification of "total energy consumption" and "time window" are required at 100, 102 and 104, respectively, in this example. Specification of the total energy consumption of the load, and the time window in which this is meant to take place, will usually be undertaken by an owner/user of the load, and in an industrial enterprise, it will possibly be prescribed by internal processes. The "forecast of the power output of renewable energies" can be contributed by an external service provider. In one embodiment, the underlying renewable energy source may be an autonomously operated source that is present at the location of the load, for example a photovoltaic installation installed on the roof of the industrial enterprise.

Depending on whether a load with continuous power consumption is involved or whether the power consumption can take place only in discrete power steps ("discrete power consumption" test) at 106, the power intervals are formed in different ways. If the power consumption can take place only in discrete power steps ("Discrete power consumption: yes"), then the power intervals are oriented to the power steps at 108 (see FIG. 1). If the power consumption can take place continuously ("Discrete power consumption: no"), then the power intervals are matched as well as possible to the forecast power P1 at the given instant at 110 (see also FIG. 2).

The time window is divided into equal-sized portions, for example, that then form the time intervals at 112. The time intervals with the associated power intervals together form the energy blocks (see also FIGS. 1 and 2).

Occasionally, restrictions exist for the interruptability of a load, and it is thus usually not desired for devices to be switched on and off again very quickly, since this can lead to greater wear. This constraint is symbolized by the "Min/Max on/off time" test at 114. Specification of minimum and maximum on and/or off periods results in not all intervals of the time window being able to be used for load control at 116 ("Min/Max on/off time: yes"). Known stochastic methods, such as the "simulated annealing" method, for example, can provide proposals for admissible time intervals in this case, and the method according to the disclosure then determines energy blocks only for these. By feeding back the costs obtained at the end (not shown), the stochastic method can be induced for further iteration steps.

If there are no kind of restrictions regarding the on and/or off periods for the load ("Min/Max on/off times: no"), then all time intervals resulting from the time window are used for constructing the energy blocks at 118.

Under "determination of the energy blocks" at 118, the power and time intervals belonging to one another are assembled to form energy blocks. These energy blocks are provided with prices at 120 that are dependent on the energy source ("Pricing of the energy blocks"). In addition, the prices may be dependent on further parameters.

The priced energy blocks are then sorted at 122 in ascending order of their prices ("Sorting of the priced energy blocks") and are summed in this order at 124 ("Summation of the energy blocks 1 . . . n") until the total energy consumption of the load has been reached at 126 ("Total energy consumption reached?: yes").

The energy blocks selected in the previous act by inclusion in the total are considered in respect of their associated power and time intervals at 128 ("Analysis of the summed time and power intervals"). Thus, the beginning of the time interval of the first energy block leads to the first switch-on instant for the load and the associated power interval leads to the power consumption that needs to be actuated at this instant. Progressing along the time profile, the selected energy blocks are thus used to ascertain switching instants and associated power, this being used as a "Plan for actuating the load" at 130 and representing the least expensive option for operation of the load, as determined within the method described above.

The invention claimed is:

1. A method for controlling a load, comprising:
providing a total energy consumption of the load and a time window for the total energy consumption of the load from one or more energy sources,
determining energy blocks, wherein the energy blocks are based on a power interval during a time interval, and wherein the time intervals are within the time window, and
wherein the energy blocks are allocated energy-source-dependent costs,
sorting the energy blocks in ascending order according to a level of the cost per energy block, wherein the costs of the energy blocks are determined by taking into account the consequential environmental costs of the energy producers producing them,
summating quantities of energy that the energy blocks contain in ascending order of sorting until the total energy consumption of the load is reached,
determining on and off times of the load using the time intervals that belong to the summed energy blocks, wherein the power intervals belonging to the respective energy blocks determine a power consumption of the load at the respective instant, and
actuating the load in accordance with the determined on and off times.

2. The method according to claim 1, wherein in the case of loads with discrete power consumption levels, the latter determine the power intervals.

3. The method according to claim 1, wherein a quantity of energy blocks that is obtained from at least one renewable energy source is determined by using a forecast.

4. The method according to claim 3, wherein in the case of loads with a continuously variable power consumption, the power intervals are determined by a power of the renewable energy source in the associated time interval.

5. The method according to claim 1, wherein the time intervals are determined as equal-sized portions of the time window.

6. A method for controlling a load, comprising:
providing a total energy consumption of the load and a time window for the total energy consumption of the load from one or more energy sources,
determining energy blocks, wherein the energy blocks are based on a power interval during a time interval, and wherein the time intervals are within the time window, wherein a quantity of energy blocks that is obtained from at least one renewable energy source is determined by using a forecast, wherein when an upper supply limit is applied, the energy blocks that are obtained from the at least one renewable energy source and that exceed the upper supply limit in accordance with the forecast are assigned the lowest costs, and
wherein the energy blocks are allocated energy-source-dependent costs,
sorting the energy blocks in ascending order according to a level of the cost per energy block,
summating quantities of energy that the energy blocks contain in ascending order of sorting until the total energy consumption of the load is reached,
determining on and off times of the load using the time intervals that belong to the summed energy blocks, wherein the power intervals belonging to the respective energy blocks determine a power consumption of the load at the respective instant, and
actuating the load in accordance with the determined on and off times.

7. An apparatus for controlling a load, comprising
a first interface configured to output control commands to the load,
a second interface configured to receive operating data from at least one renewable energy source and send control commands to the at least one renewable energy source,
a third interface configured to receive a forecast by means of which a quantity of energy blocks that can be obtained from the renewable energy source is determined, or further configured to receive data for preparing a forecast,
wherein the apparatus is configured to:
provide a total energy consumption of the load and a time window for the total energy consumption of the load from one or more energy sources,
determine energy blocks, wherein the energy blocks are based on a power interval during a time interval, and wherein the time intervals are within the time window, and
wherein the energy blocks are allocated energy-source-dependent costs,
sort the energy blocks in ascending order according to a level of the cost per energy block,
summate quantities of energy that the energy blocks contain in ascending order of sorting until the total energy consumption of the load is reached,
determine on and off times of the load using the time intervals that belong to the summed energy blocks, wherein the power intervals belonging to the respective energy blocks determine a power consumption of the load at the respective instant, and
actuate the load in accordance with the determined on and off times.

* * * * *